UNITED STATES PATENT OFFICE.

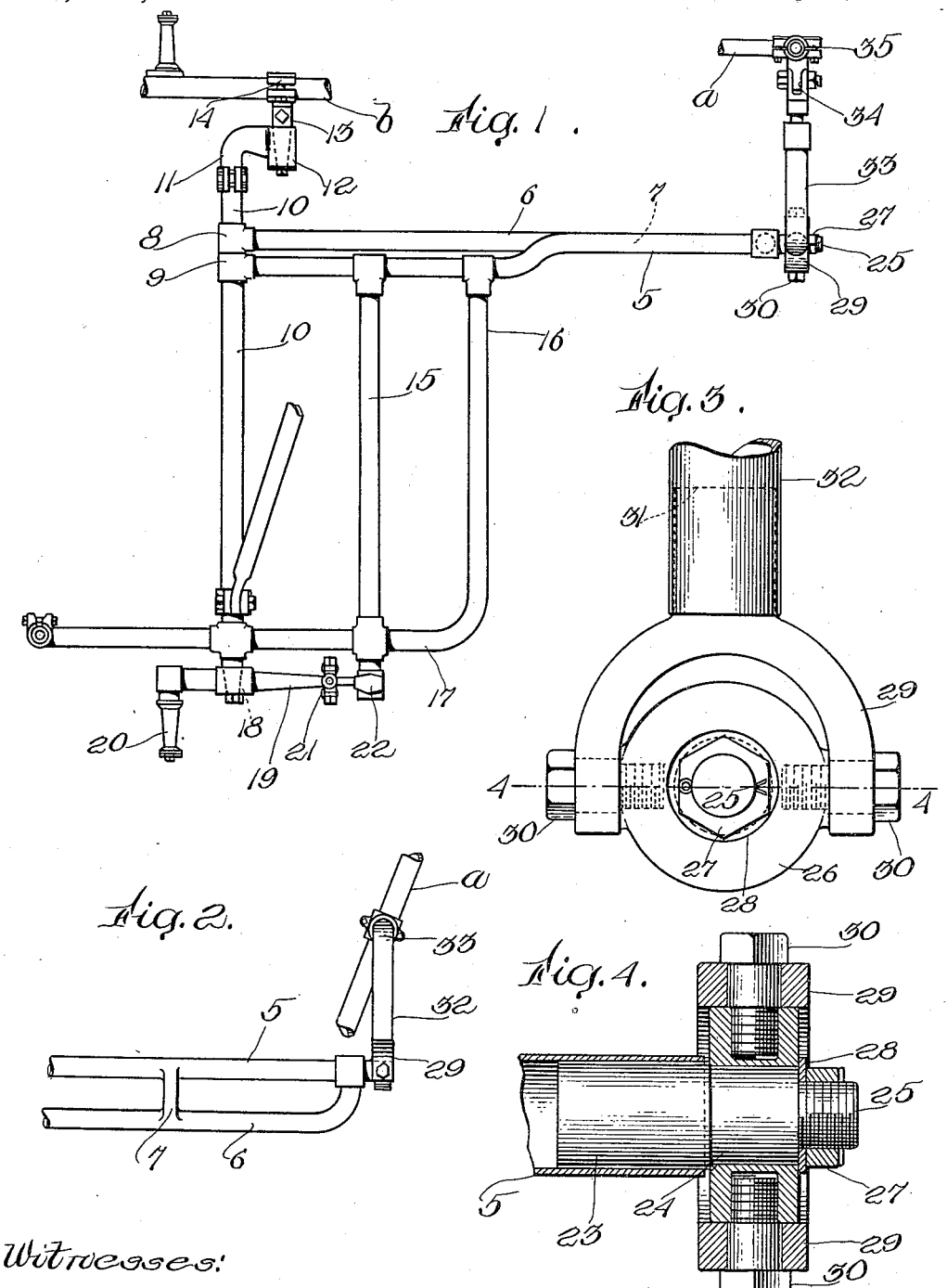

JAMES S. R. BAXTER, OF CAMBRIDGE, MASSACHUSETTS, ASSIGNOR TO BAXTER SIDE CAR COMPANY, A CORPORATION OF MASSACHUSETTS.

EXTENSION-FRAME FOR BICYCLES.

1,070,320.  Specification of Letters Patent.  Patented Aug. 12, 1913.

Application filed December 16, 1912. Serial No. 736,984.

*To all whom it may concern:*

Be it known that I, JAMES S. R. BAXTER, of Cambridge, in the county of Middlesex and State of Massachusetts, have invented certain new and useful Improvements in Extension-Frames for Bicycles, of which the following is a specification, reference being had to the accompanying drawings, forming part thereof.
This invention has reference to improvements in side extension frames for bicycles of the character described in my application for Letters Patent of the United States, Serial No. 709,329, filed July 15, 1912, to which reference is made.

One object of the invention is to so construct a front connection for a side car, so called, or side extension frame for a bicycle and particularly for a motor driven bicycle that torsional strains may be eliminated between the side extension frame and the forward or front connection to the main frame.

Other objects of the invention will appear from the following description.
The invention consists in such peculiar features of construction and combination of parts as shall hereinafter be more fully described and pointed out in the claims.

Figure 1, represents a plan view of a side extension frame, for bicycles, having the improved front connection, parts of the bicycle frame being shown. Fig. 2, represents a side elevation of parts of the same. Fig. 3, represents an enlarged front elevation of the improved connection. Fig. 4, represents a sectional view taken on line 4—4 Fig. 3.

Similar reference characters designate corresponding parts throughout.
In the drawings *a* represents a front frame member of a bicycle frame and *b* one of the rear wheel fork members to which the side car or side extension frame is to be secured. In some makes of bicycle frames and particularly of those adapted to be driven by motors it is found to be desirable to provide for a certain flexibility of connection between the main frame and the side extension frame and I find that in some motor driven bicycles a tendency exists to exert a torsional strain on the front portion of a side extension frame secured thereto whereby said side frame is strained.

In carrying this invention into practice to avoid the objections named and to provide a side extension frame adapted for comfortable and safe use I construct the side frame having the side truss formed by the upper and lower longitudinal members 5 and 6 furnished with the stay 7 and connected together at their forward end portions while their rear ends have the elbows 8 and 9 mounted on the cross member 10 to the inner end of which is adjustably secured the elbow 11 having the sleeve 12 furnished with a tapering bore to fit the taper member 13 of the rear attachment clamp 14. To the truss member 5 are secured the outwardly extending members 15 and 16 of which the latter is bent so that its outer end portion 17 extends approximately parallel to the general direction of truss member 5 and, to this outer portion 17 are secured the outer ends of the members 10 and 15. Extending in line with member 10 and secured to member 17 is the spindle 18 carrying the pivoted lever 19 having the wheel pintle 20, resistance to the swinging of this lever 19 being provided by the spring 21 carried by the frame member 22 and acting on one end of said lever 19 as clearly will be seen by reference to my application for Letters Patent above referred to.

The forward end of the member 5 is fitted with the plug 23 having the pintle 24 reduced as to its diameter from said plug 23 to form a shoulder and having the screw threaded extension 25. The pintle 24 is received in the bore of the collar 26 and said collar is secured in place by the nut 27 screwed on to the screw threaded extension 25 against the washer 28 which bears against said collar. This collar 26 is free to swing in the yoke 29 in the bearing of which are journaled the screws 30, 30 having threaded ends which are secured in threaded sockets of the said collar 26 while the yoke 29 has the plug member 31 secured in the tubular arm 32 of the elbow 33 which is furnished with two part clip 34 having the securing clamp 35 adapted to be secured to the front member *a* of the bicycle frame. By means of this front connection movement of the elbow 33 will not be transmitted to the frame member 5 as a torsional strain on said member in view of the fact that the connections between said elbow and said frame member 5 may yield in two directions.

Having thus described my invention I claim as new and desire to secure by Letters Patent.

1. An extension frame for bicycles comprising a side member having at its forward end a pintle, a collar in which said pintle is journaled, a yoke in which said collar is mounted to swing and an upwardly extending frame connecting member mounted on said yoke.

2. An extension frame for bicycles comprising a side truss having two members one longer than the other and having a pintle at its forward end, an elbow member having at its upper end a clamp and at its lower end a yoke, and a collar pivotally mounted in said yoke and having a bearing in which said pintle is journaled, substantially as described.

JAMES S. R. BAXTER.

Witnesses:
HENRY J. MILLER,
ESTHER C. MURPHY.

Copies of this patent may be obtained for five cents each, by addressing the "Commissioner of Patents, Washington, D. C."